US010928921B2

(12) United States Patent
Hoffnung et al.

(10) Patent No.: US 10,928,921 B2
(45) Date of Patent: Feb. 23, 2021

(54) GESTURE BASED USER INTERFACE

(71) Applicant: APPLE INC., Cupertino, CA (US)

(72) Inventors: Amir Hoffnung, Tel Aviv (IL); Micha Galor, Tel Aviv (IL); Jonathan Pokrass, Rishon Lezion (IL); Roee Shenberg, Jerusalem (IL); Shlomo Zippel, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/550,423

(22) Filed: Aug. 26, 2019

(65) Prior Publication Data

US 2019/0377420 A1    Dec. 12, 2019

Related U.S. Application Data

(63) Continuation of application No. 15/434,081, filed on Feb. 16, 2017, now Pat. No. 10,429,937, which is a continuation of application No. 13/161,508, filed on Jun. 16, 2011, now abandoned.

(60) Provisional application No. 61/355,574, filed on Jun. 17, 2010.

(51) Int. Cl.
*G06F 3/01* (2006.01)
*G06F 3/0482* (2013.01)
*G06F 3/0488* (2013.01)
*G06F 3/0481* (2013.01)

(52) U.S. Cl.
CPC ............ *G06F 3/017* (2013.01); *G06F 3/0482* (2013.01); *G06F 3/04883* (2013.01); *G06F 3/04812* (2013.01); *G06F 2203/04808* (2013.01)

(58) Field of Classification Search
CPC .... G06F 3/017; G06F 3/04883; G06F 3/0481; G06F 3/04812; G06F 3/0482; G06F 2203/04808
USPC .................. 345/156–158; 715/810, 863, 856
See application file for complete search history.

(56) References Cited

U.S. PATENT DOCUMENTS

| 2009/0027337 | A1* | 1/2009 | Hildreth | G06F 3/011 |
| | | | | 345/158 |
| 2009/0079813 | A1 | 3/2009 | Hildreth | |
| 2009/0124379 | A1 | 5/2009 | Wells | |
| 2009/0228841 | A1* | 9/2009 | Hildreth | G06F 3/0304 |
| | | | | 715/863 |
| 2010/0229125 | A1* | 9/2010 | Cha | G06F 3/017 |
| | | | | 715/828 |

OTHER PUBLICATIONS

U.S. Appl. No. 15/806,350 office action dated Dec. 9, 2019.

\* cited by examiner

*Primary Examiner* — Jimmy H Nguyen
(74) *Attorney, Agent, or Firm* — Kligler & Associates Patent Attorneys Ltd

(57) ABSTRACT

A gesture based user interface includes a movement monitor configured to monitor a user's hand and to provide a signal based on movements of the hand. A processor is configured to provide at least one interface state in which a cursor is confined to movement within a single dimension region responsive to the signal from the movement monitor, and to actuate different commands responsive to the signal from the movement monitor and the location of the cursor in the single dimension region.

15 Claims, 2 Drawing Sheets

GESTURE BASED USER INTERFACE

CROSS-REFERENCE TO RELATED APPLICATION

This application is a continuation of U.S. patent application Ser. No. 15/434,081, filed Feb. 16, 2017, which is a continuation of U.S. patent application Ser. No. 13/161,508, filed Jun. 16, 2011 (abandoned), which claims the benefit of U.S. Provisional Patent Application 61/355,574, filed Jun. 17, 2010, which is incorporated herein by reference.

FIELD OF THE INVENTION

The present invention relates generally to user interfaces, and specifically to gesture based user interfaces.

BACKGROUND OF THE INVENTION

Gesture based user interfaces allow users to control electronic devices and/or provide user input by hand gestures. Various systems have been described for identifying the hand gestures.

U.S. Pat. No. 4,988,981 to Zimmerman et al., titled: "Computer Data Entry and Manipulation Apparatus and Method", describes a glove worn on a user's hand which is used in generating control signals for the manipulation of virtual objects.

U.S. Pat. No. 4,550,250 to Mueller et al., titled: "Cordless Digital Graphics Input Device", describes a cordless graphics input device based on an infrared emitting module.

PCT publication WO2007/043036 to Zalevsky et al. describes identifying hand gestures using a coherent light source and a generator of a random speckle pattern.

Systems based on identifying hand gestures allow a wide range of inputs and can be used, for example, for text entry and for three dimensional control of animation in real time, such as in a virtual reality program running on a computer, as described in U.S. Pat. No. 6,452,584 to Walker et al., titled: "System for Data Management Based on Hand Gestures".

Hand gestures may be used in simpler environments. US patent application publication 2008/0256494 to Greenfield describes using hand gestures to control the flow and temperature of water of a faucet. In one embodiment it is suggested that movements of the hand with one finger held up are interpreted as controlling the water flow, and movements with two fingers held up control the temperature.

U.S. Pat. No. 5,549,469 to Freeman et al., titled: "Hand Gesture Machine Control System", describes a system in which hand gestures are used to move a hand icon over various controls on a screen. Only a single gesture is used to control multiple functions. An additional gesture is used to turn on the system and thus random gestures are prevented from being interpreted as control movements.

U.S. Pat. No. 7,821,541 to Delean, titled: "Remote Control Apparatus Using Gesture Recognition", describes controlling a television system using hand gestures. Up and down movements are interpreted as controlling the volume, and left and right movements are interpreted as controlling the channel. In order to increase the number of commands that may be invoked via hand gestures, a sequence of multiple hand gestures can be interpreted as a single command. In order to avoid interpreting random movements as control instructions, a dormant mode is defined, and the user is required to signal a desire to move to an active mode before providing instructions.

SUMMARY OF THE INVENTION

Embodiments of the present invention that are described hereinbelow provide systems for control of multiple functions using hand gestures.

There is therefore provided in accordance with an embodiment of the present invention a gesture based user interface, comprising a movement monitor configured to monitor a user's hand and to provide a signal based on movements of the hand; a display; and a processor configured to move a cursor responsive to the signal from the movement monitor, within a predetermined region on the display, formed of a plurality of sub-regions associated with respective control commands, and to provide the commands to a controlled application responsively to the movements of the hand. The sub-regions include at least one quick-access sub-region, for which the processor provides the command associated with the sub-region responsively to entrance of the cursor into the quick-access sub-region without additional user hand movements, and at least one regular sub-region, for which the processor provides the command associated with the sub-region responsively to identifying a predetermined hand gesture while the cursor is in the sub-region.

Optionally, the predetermined region comprises a single-dimensional region. Optionally, the predetermined region comprises a horizontal bar. Optionally, the processor is configured to define two quick-access sub-regions, one on each end of the single-dimensional region. Optionally, the predetermined region is a convex region. Optionally, the predetermined region does not include gaps between the sub-regions associated with respective control commands. Optionally, the first sub-regions are on the edges of the region.

Optionally, the processor is configured to ignore downward components of movements of the hand. Optionally, the quick-access sub-regions are located within the predetermined region such that downward movements do not lead to a quick-access sub-region.

There is further provided in accordance with an embodiment of the present invention a gesture based user interface, comprising a movement monitor configured to monitor a user's hand and to provide a signal based on movements of the hand; a display; and a processor configured to move a cursor responsive to the signal from the movement monitor, within a predetermined region on the display, formed of a plurality of sub-regions associated with respective control commands, and to provide the commands to a controlled application responsively to the movements of the hand. The processor is configured to ignore downward movements in controlling the cursor.

Optionally, the processor is configured to entirely ignore downward movements.

There is further provided in accordance with an embodiment of the present invention a method of receiving user input, comprising identifying movements of the hand of a user; moving a cursor within a predetermined region, formed of a plurality of sub-regions associated with respective control commands, by a processor, responsive to the identified movements; and actuating a control command associated with a sub-region in which the cursor is located, wherein the sub-regions include at least one quick-access sub-region for which the associated command is actuated responsive to entrance of the cursor into the quick-access sub-region without requiring additional user hand movements and at least one regular sub-region, for which the associated command is actuated responsive to identifying a predetermined hand gesture while the cursor is in the sub-region.

Optionally, the predetermined hand gesture comprises an upward gesture. Optionally, moving the cursor within the predetermined region comprises moving along a single-dimensional region.

There is further provided in accordance with an embodiment of the present invention a computer software product, comprising a tangible computer-readable medium in which program instructions are stored, which instructions, when read by a computer, cause the computer to identify movements of a user; move a cursor within a predetermined region, formed of a plurality of sub-regions associated with respective control commands, responsive to the identified movements; and actuate a control command associated with a sub-region in which the cursor is located.

The sub-regions include at least one quick-access sub-region for which the associated command is actuated responsive to entrance of the cursor into the quick-access sub-region without requiring additional user hand movements and at least one regular sub-region, for which the associated command is actuated responsive to identifying a predetermined hand gesture while the cursor is in the sub-region.

There is further provided in accordance with an embodiment of the present invention a gesture based user interface, comprising a movement monitor configured to monitor a user's hand and to provide a signal based on movements of the hand; a display; and a processor configured to provide at least one interface state in which a cursor is confined to movement within a single dimension region responsive to the signal from the movement monitor, and to actuate different commands responsive to the signal from the movement monitor and the location of the cursor in the single dimension region.

Optionally, the single-dimensional region comprises a horizontal bar in which the cursor is confined only to right and left movements. Optionally, the processor is configured to allow the cursor to exit the single-dimensional region from a predetermined sub-region of the single-dimensional region. Optionally, the single-dimensional region covers less than 10% of the display. Optionally, the single-dimensional region comprises a plurality of adjacent sub-regions associated with different values of a single parameter.

The present invention will be more fully understood from the following detailed description of the embodiments thereof, taken together with the drawings in which:

DETAILED DESCRIPTION OF EMBODIMENTS

Figure 1:
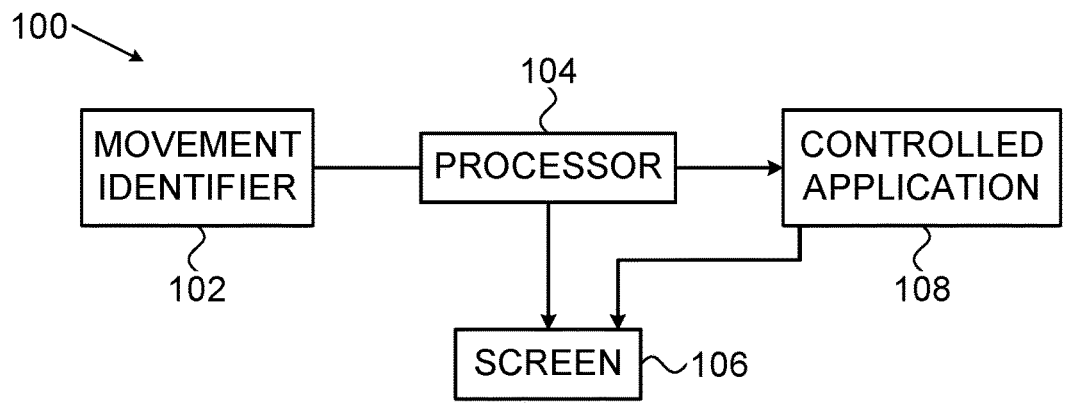
FIG. 1 is a block diagram of a control system based on identifying hand gestures, in accordance with an embodiment of the present invention.

Although gesture based user interfaces have made significant advances, there are at least two major issues that still require additional attention. The first is the differentiation between user movements intended to be interpreted as control instructions and random movements that should be ignored. The second is allowing the user a range of commands, without making the interface too complex.

An aspect of some embodiments of the invention relates to a user interface based on identification of hand gestures in which a processor controls movement of a cursor (represented by an arrow, hand, or other icon or pointer) responsive to identified hand movements. The movements of the cursor are confined within a predetermined region on a display, formed of sub-regions corresponding to different respective controls. At least one of the sub-regions is a quick-access sub-region, which enables actuation of the respective control by positioning the cursor in the sub-region and/or moving the cursor within the sub-region, without additional user gestures, while other sub-regions require an additional user gesture to actuate the respective control of the sub-region.

In some embodiments, the quick-access sub-regions are on the edges of the predetermined region. Optionally, the region comprises a one-dimensional bar, such as a horizontal bar, in which the cursor is restricted to horizontal movements. Alternatively, the region comprises a two dimensional region. Optionally in accordance with this alternative, quick-access sub-regions cannot be accessed from a non-quick-access sub-region by a mere downward movement, such that downward movements (which are often inadvertent movements) are not undesirably interpreted as control commands.

The quick-access sub-regions allow fast actuation for their respective control acts, without requiring additional user gestures. Limiting this feature to specific sub-regions prevents control acts from being performed inadvertently.

Optionally, the region on the display is a continuous region without gaps between adjacent sub-regions. In some embodiments of the invention, the region is a convex region. Alternatively or additionally, the region covers only a fraction of the screen on which it is displayed, such as less than 30%, less than 20% or even less than 10% of the area of the screen.

An aspect of some embodiments of the invention relates to a user control system based on identification of hand gestures, having at least one state in which a processor controls movement of a cursor within a single dimension horizontal bar. The horizontal bar is formed of sub-regions corresponding to different respective controls, for selection of a control to be manipulated. By confining the movements of the cursor to a horizontal bar, it is easier for the user to identify the location of the cursor and to control its movements, at the expense of limiting the number of control icons available for selection.

In some embodiments of the invention, in one or more of the sub-regions, a command of the sub-region is invoked by a specific predetermined user movement, such as an upward gesture, a twist gesture and/or a movement of a specific number of fingers. Alternatively or additionally, the command of one or more sub-regions is invoked by the mere entrance into the sub-region. Optionally, the cursor is not moved out of the horizontal bar at all.

Alternatively, in one or more sub-regions, the command of the sub-region is invoked by moving a cursor (represented by the same icon or by a different icon) controllably outside the horizontal bar. For example, when invoking a sub-region associated with a multi-value parameter (e.g., volume control), a parameter value control may be displayed, for example in the form of a vertical bar or a separate horizontal bar, and the user moves a cursor within this bar. Optionally, when completing adjusting the value of the parameter, a user indication, such as a swivel or no-movements for a predetermined period are interpreted as a return to the horizontal bar.

Optionally, the horizontal bar covers only a small part (e.g., less than 20%, less than 10% or even less than 5%) of a general display. In some embodiments, one or more of the sub-regions allows exiting the horizontal bar into the general area of the entire display. In order to exit to the general display, the user moves the cursor to the specific sub-region of the horizontal bar assigned to the exit of the cursor, possibly through a specific gate in the border of the sub-region. Optionally, the return to the horizontal bar is also limited only to the specific sub-region or to the specific gate. Alternatively, the return to the horizontal bar is allowed from any direction, to simplify the return to the horizontal bar.

In some embodiments of the invention, the general display is divided into a plurality of sub-areas and the access to each sub-area is from a different sub-region and/or gate of the horizontal bar.

An aspect of some embodiments of the invention relates to a user interface based on identification of hand gestures in which a processor controls movement of a cursor within a predetermined region, formed of sub-regions corresponding to different respective controls, in which downward motions are ignored.

It is noted that in some embodiments, once a user selects a specific control to be manipulated by further hand gestures, downward gestures may be used for the further control of the specific control. In other embodiments, downward gestures are not used at all. Avoiding the use of downward movements reduces the chances of inadvertent movements being interpreted as requesting desired actions.

FIG. 1 is a block diagram of a control system 100 based on identifying hand gestures, in accordance with an embodiment of the present invention. Control system 100 comprises a movement identifier 102 adapted to identify movements of a user's hand and a processor 104 which receives indications of movements from identifier 102 and accordingly adjusts a display on a screen 106 and provides commands to a controlled application 108. Processor 104 typically comprises a general-purpose computer processor, with a suitable memory and control interfaces. The processor is programmed in software to carry out the functions described hereinbelow. This software may be downloaded to processor 104 in electronic form, over a network, for example. Alternatively or additionally, the software may be stored on tangible storage media, including non-volatile storage media, such as optical, magnetic, or electronic memory.

In some embodiments of the invention, movement identifier 102 comprises an infrared depth mapping system, which may comprise a coherent light source and a generator of a random speckle pattern as described, for example, in PCT publication WO2007/043036 to Zalevsky et al., the disclosure of which is incorporated herein by reference. Another suitable depth mapping system that may be used for this purpose is described in US patent application publication 2010/0007717, whose disclosure is also incorporated herein by reference. This sort of depth map is segmented, and parts of the user's body are identified and tracked in order to identify user gestures, as described, for example, in U.S. patent application Ser. No. 12/854,187, filed Aug. 11, 2010, and in US patent application publication 2011/0052006, whose disclosures are also incorporated herein by reference. Processor 104 computes or receives location coordinates and gesture indications with respect to the user's hand within a certain volume in space, and associates this volume with a region on screen 106, as described further hereinbelow.

In other embodiments, movement identifier 102 comprises a glove, such as described in U.S. Pat. No. 4,988,981, the disclosure of which is incorporated herein by reference. In still other embodiments, movement identifier 102 operates based on capacitance coupling and/or is based on the user's hand holding or wearing a signal transmitter, such as an infrared emitting module. Movement identifier 102 may comprise also other devices.

Controlled application 108 may run on processor 104 together with a control application which performs the control tasks described herein, or may run on a separate processor. Such a separate processor may be included with processor 104 in a same housing, or may be a completely external unit to processor 104, connected through a cable and/or wirelessly to processor 104. Controlled application 108 may include, for example, a television set, set-top box, a VCR, a DVD player, a computer game, a console or other devices, such as home appliances and kitchen appliances.

Screen 106 is optionally shared by processor 104 and controlled application 108, although in some embodiments, separate screens may be used.

Figure 2:
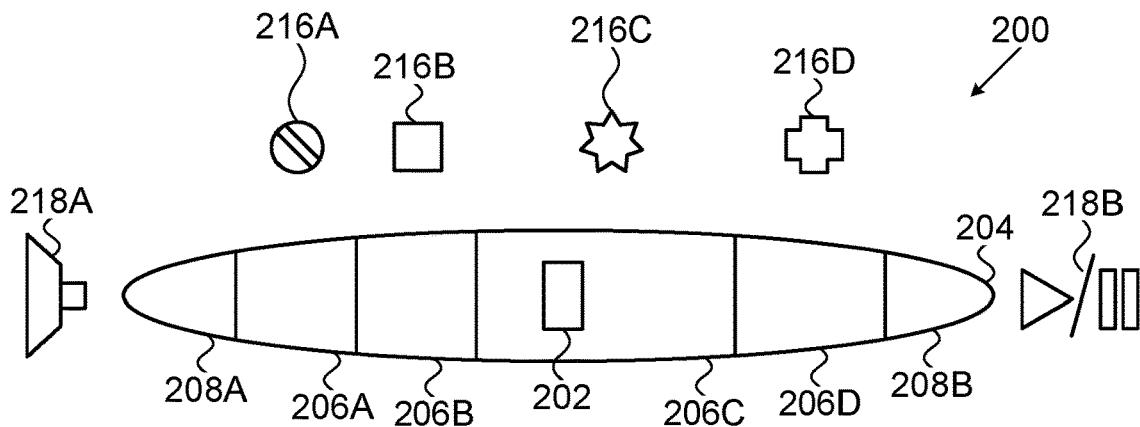
FIG. 2 is a schematic view of a horizontal bar user interface, in accordance with an embodiment of the present invention.

FIG. 2 is a schematic illustration of a horizontal bar user interface 200 displayed on screen 106, in accordance with an embodiment of the present invention. User interface 200 includes a controlled cursor 202, which is constrained to move along a horizontal bar 204, following left and right hand gestures. Horizontal bar 204 is divided into a plurality of sub-regions 206A, 206B, 206C, 206D, 208A and 208B corresponding to respective controls. Optionally, one or more of the sub-regions is a quick-access sub-region 208 (marked 208A and 208B), for which the entrance of controlled cursor 202 into the sub-region causes processor 104 to actuate the corresponding command without requiring additional input from the user. In contrast, one or more other sub-regions 206 (Marked 206A, 206B, 206C and 206D) are regular sub-regions in which the presence of controlled cursor 202 therein does not cause on its own command actuation of the corresponding control by processor 104.

Sub-regions 206 may all be of the same size, or different sub-regions 206 may have different sizes, for example according to the relative importance of their corresponding command. Similarly, quick-access sub-regions 208 may all be the same size or different quick-access sub-regions 208 may have different sizes according to their corresponding controls. For example, popular commands may correspond to larger sub-regions and/or controls whose commands have a larger span of values may correspond to larger sub-regions.

In some embodiments, quick-access sub-regions 208 are on the edges of the predetermined region. This allows the user to quickly move the cursor 202 into a quick-access sub-region 208 without worrying about accurately moving into the sub-region without passing it. Alternatively or additionally, one or more quick-access sub-regions 208 are not on edges of the horizontal bar, thus allowing a larger number of quick-access sub-regions 208. Such quick-access sub-regions 208 which are not on edges of the horizontal bar are referred to herein as hover sub-regions. Optionally, hover regions are located adjacent edge-located quick-access sub-regions having a similar associated command, such as controlling the same parameter but to a different extent (e.g., sub-region 206D is a hover sub-region having a similar command as sub-region 208B). Thus, if a user reaches inadvertently one of the sub-regions and not the other the same general command is performed. For example, quick-access sub-regions 208 may be used to control scrolling of items in a menu, with hover sub-regions and adjacent edge located sub-regions differing in the scrolling speed. In some embodiments, a plurality of adjacent sub-regions (e.g., at least 3, at least 5 or even at least 8 adjacent sub-regions) are associated with different values of a single parameter.

Display Indications

Optionally, each regular sub-region 206 and/or each quick-access sub-region 208 is associated with a respective symbol 216 (marked 216A, 216B, 216C and 216D) or 218 (marked 218A and 218B), which indicates the command associated with the sub-region. In some embodiments of the invention, when controlled cursor 202 enters a sub-region 206 and/or 208, the corresponding symbol 216 or 218 is modified to indicate the presence of cursor 202 in the respective sub-region. The modification of symbol 216 or 218 includes, for example, enlargement of the symbol and/or increasing of the brightness of the symbol. Other modifications may be used additionally or alternatively, such as color changes, rotation and/or changes in the shape or texture of the symbol itself. In some embodiments of the invention, the entrance of cursor 202 into a different sub-region is indicated by an audio sound, for example a quiet tick sound. Different sounds may be used for the entrance into different sub-regions or for the entrance into different types of sub-regions, e.g., 206 vs. 208, or the same sound may be used for all sub-regions. In one embodiment, sounds are used only to indicate entrance into regular sub-regions 206.

In some embodiments of the invention, when cursor 202 enters a sub-region 206 or 208, the size of the sub-region is enlarged, such that leaving the sub-region requires moving a larger extent than entering the sub-region. This provides a hysteresis effect and prevents flickering between sub-regions due to small user movements. The entered sub-region 206 may be enlarged only in the direction closest to the current location of cursor 202 or may be enlarged in all directions for symmetry.

Optionally, when a command corresponding to a sub-region 206 is actuated, its corresponding symbol 216 is modified to so indicate, for example by increasing its brightness and/or changing its color in a manner different from that used to indicate that cursor 202 is in the corresponding sub-region 206. Alternatively or additionally, a distinct audio signal indicates command actuation, the same audio signal being used for all command actuations or different sounds may be used for different commands. Optionally, the audio signal indicating command actuation is different from the audio signal indication entering into a sub-region 206.

Horizontal Bar Extent

Optionally, horizontal bar 204, regardless of its display length, corresponds to a sufficiently large extent of horizontal movement of the hand, so that small inadvertent movements are not interpreted as user commands to move between sub-regions 206 or to enter a quick-access sub-region 208. For example, the extent of horizontal movement is optionally greater than 10 centimeters, greater than 15 centimeters or even greater than 20 centimeters. On the other hand, the extent of horizontal movement corresponding to the extent of horizontal bar 204 is not too large, so as to require uncomfortable substantial movements from the user in order to move between sub-regions. Optionally, the extent of horizontal movement is smaller than 35 centimeter, smaller than 30 centimeters or even shorter than 25 centimeters. In one particular embodiment the horizontal extent is 24 centimeters.

As shown, in some embodiments, sub-regions 206 are adjacent each other, without gaps between them. In other embodiments, the horizontal bar includes gaps between sub-regions. In the gaps, user upward movements are ignored as the gaps are not associated with a command.

Inadvertent Command Avoidance

In some embodiments of the invention, downward movements are ignored and are not used for commands, as downward movements are commonly performed inadvertently. Optionally, movements along the depth axis, are also ignored. Alternatively, some downward movements having specific characteristics may be interpreted as commands. For example, a substantial downward movement may be interpreted as an instruction to discontinue control of controlled application 108 based on the user's movements, allowing the user to move freely without causing unwanted control operations. A predetermined user movement is used to re-establish the control.

Optionally, upward hand gestures are considered as commands only if provided within a predetermined time from entering a sub-region 206. Thus, the chances of inadvertent gestures being interpreted as commands is decreased. Alternatively or additionally, when not moved for at least a predetermined time, cursor 202 is moved to a default location, for example in the center of horizontal bar 204, so as to reduce the chances of an inadvertent move into a quick-access sub-region 208. In other embodiments, cursor 202 is not moved after a period of non-use, allowing a user to leave cursor 202 near a quick-access sub-region 208 and quickly enter the sub-region, when desired.

Command Actuation

Actuation of the command corresponding to a regular sub-region 206 is optionally performed responsive to a specific user hand movement, for example an upward movement of at least a predetermined extent, for example at least 0.5 centimeter, at least 2 centimeters, at least 5 centimeters or even at least 8 centimeters. Requiring at least a minimal extent of the upward movement reduces the possibility that an inadvertent movement is interpreted as a user instruction. In some embodiments of the invention, the extent of the hand movement (e.g., upward movement) considered by processor 104 as a user instruction is user-adjustable.

In some embodiments, processor 104 automatically adjusts the extent of hand movements considered as a user command according to tracking of instructions which are cancelled by the user shortly after they are given. For example, processor 104 may keep track of the extent of upward hand movements of user commands and the corresponding time passing between when the instruction is given and when it is cancelled. If it is determined that a large percentage of commands given by relatively short upward hand gestures are cancelled within a short period, a threshold for interpreting upward gestures as commands may be increased.

Processor 104 may also monitor the number of occurrences of relatively short upward movements which were ignored and were then followed by a larger upward movement interpreted as a user command, in the same sub-region. The threshold of the size of a movement may be lowered if at least a predetermined number (e.g., at least 1, at least 3, at least 5) of such occurrences are identified within a predetermined period (e.g., 10 minutes, an hour).

Two-Dimensional Embodiment

Figure 3:
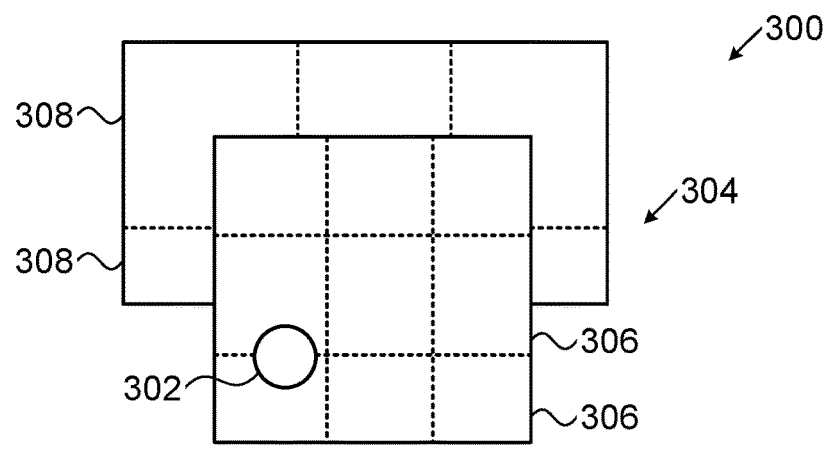
FIG. 3 is a schematic view of a two dimensional user interface, in accordance with an embodiment of the present invention.

FIG. 3 is a schematic illustration of a displayed two-dimensional user interface 300, in accordance with an embodiment of the invention. In this embodiment, sub-regions 306 and 308 are distributed in a two-dimensional array 304, and a cursor 302 is moved around array 304 to select a sub-region 306 or 308. Sub-regions 308 on the periphery of array 304 are optionally quick-access sub-regions for which entrance of cursor 302 therein incurs actuation of their respective command without requiring further user input. Sub-regions 306, on the other hand, are regular sub-regions which require additional user input, such as a push, pull, circular or swerve gesture to actuate their corresponding command. Alternatively or additionally, other gestures may be used to actuate the command of a sub-region 306, such as quick left-right flicks. In some embodiments, the command of a sub-region 306 is actuated if cursor 302 is in the sub-region for longer than a predetermined period. The predetermined period is optionally at least 3 seconds, at least 5 seconds or even at least 10 seconds.

As shown, quick-access sub-regions 308 are located on the upper area of array 304, such that downward movements, which are more commonly performed inadvertently, do not cause cursor 302 to move into a quick-access sub-region 308.

Command Types

In some embodiments of the invention, the commands corresponding to regular sub-regions 206 are toggling commands which simply require a user indication that the command is to be performed. The toggling commands may include, for example, on/off, select, menu display and/or increase of a variable (e.g., volume) by a predetermined value. Optionally, in these embodiments, for sub-regions 206 assigned to controlling a variable, such as volume, requiring receiving user input as to an extent of change of the variable value, a separate horizontal bar, for receiving a desired value of the variable is displayed responsive to a user's upward hand gesture in the corresponding sub-region 206. Alternatively, the upward hand gesture controls the variable value according to its extent above a minimal threshold. In some embodiments of the invention, the variable value is controlled from its current value. Alternatively or additionally, each time the variable is controlled, the variable value begins from a minimal value at the point at which the upward gesture passes the threshold.

In some embodiments of the invention, two separate sub-regions 206 are assigned to multi-value variables, one for increasing the value of the variable and the other for decreasing the variable value.

Optionally, a visual vertical bar is displayed near the symbol of the current sub-region 206, indicating the extent of upward movement of the hand gesture. The bar may indicate the extent required in order to reach the minimal threshold required for the gesture to be considered a user indication and/or may indicate the extent beyond the threshold, for cases in which the command involves a range of values.

Quick-Access Sub-Regions

In some embodiments of the invention, quick-access sub-regions 208 and/or 308 are used for toggling commands. Alternatively, one or more of the quick-access sub-regions 308 are used for controlling a parameter value on a multi-value scale, such as for scrolling, channel control or volume control. Optionally, each time cursor 202 or 302 enters the quick-access sub-region 208 or 308, the value of the parameter is increased by a predetermined value. Alternatively or additionally, the time for which the cursor 202 is in quick-access sub-region 208 defines the extent of change of the parameter value. In some embodiments of the invention, two quick access sub-regions 208 or 308 are used for each parameter, one for increasing the parameter and the other for decreasing the parameter.

Alternatively, the horizontal orientation of quick access sub-regions 208 or 308 is used for controls requiring indication of an extent. In some embodiments of the invention, one or more of quick access sub-regions 208 or 308 is divided into a plurality of zones which are associated with different values or with different extents of value change. The value control optionally depends only on horizontal movements in the sub-region 308, ignoring vertical movement components. Sub-regions 308 may have various shapes, including, as shown, rectangular and L-shaped sub-regions. Other shapes, including triangular and round shapes may be used.

Further alternatively or additionally, any of the control methods described above regarding sub-regions 206 may be used for sub-regions 208, including opening a separate horizontal or vertical bar.

Optionally, quick-access sub-regions 208 and 308 are assigned to commands that are used more frequently than other commands and/or for commands that should be available at all times. For example, quick-access regions may be used for "mute" or "pause" in a video/audio control system and/or for a home command, for returning to a home state of the user interface.

The commands assigned to quick-access sub-regions 208 or 308 are optionally commands which are easily reversible by the user. Alternatively or additionally, the commands assigned to quick-access sub-regions 208 or 308 do not directly control an operation of controlled application 108, but rather perform adjustments or selections which require other commands to cause operations of controlled application 108. In other embodiments, the commands assigned to quick-access sub-regions 208 or 308 do not control acts of controlled application 108 which interact with the user, such as changing the volume and/or beginning and/or changing a viewed program.

Figure 4:
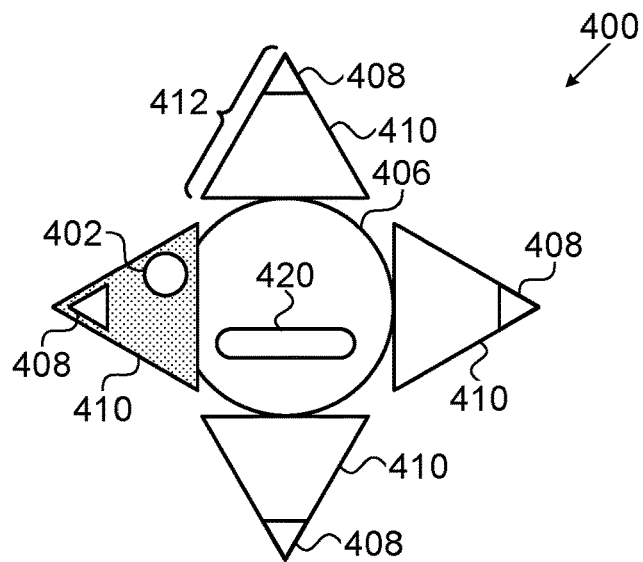
FIG. 4 is a schematic illustration of a joystick user interface, in accordance with another embodiment of the invention.

FIG. 4 is a schematic illustration of a joystick user interface 400, in accordance with another embodiment of the invention. Interface 400 includes a central sub-region 406 serving as a joystick button and four directional triangles 412 formed of pairs of quick access sub-regions 410 and 408. Sub-regions 410 are hover sub-regions associated with slow movement in a specific direction and adjacent sub-regions 408 are associated with movement in the same direction, but at a faster speed.

It is noted that triangles 412 may include more than two sub-regions each, possibly, 3, 4 or even more, allowing the user more flexibility in choosing the speed. Alternatively or additionally, central sub-region 406 may be divided into a plurality of sub-regions corresponding to different button commands. In some embodiments of the invention, a horizontal bar 420 including a plurality of sub-regions, such as one similar to user interface 200 is located within central sub-region 406. Horizontal bar 420 may be displayed continuously, or may be displayed responsive to a user command given when cursor 402 is within central sub-region 406. Optionally, when usage of horizontal bar 420 is invoked, for example by hovering cursor 402 over its location and providing a unique user movement, such as a hand twist or movement along the depth axis, the movement of cursor 402 is confined to horizontal bar 420. Optionally, one of the sub-regions of horizontal bar 420 is assigned to a command to allow cursor 402 to leave the horizontal bar. Alternatively or additionally, a unique user movement may be used to allow indication of leaving the horizontal bar 420 from any point therein.

Sub-Menus

Interfaces 200 and 300 may include control of all commands that are available to a user. Alternatively, one or more of the sub-regions may be assigned to a command of entering a sub-interface and/or of returning back to a parent or main interface.

In some embodiments of the invention, the sub-menu includes a sub-region thereof assigned to a command of returning back to the main menu. The "return" command is optionally achieved by an upward gesture, like the other commands, so that a downward gesture for the "return" command is not required. In other embodiments, processor 104 automatically returns to the main menu after a predetermined time and/or after a predetermined period of inaction. In some embodiments, downward gestures are allowed in sub-menus, while being ignored in the main menu. Accordingly, downward gestures may be used to return to the main menu.

Examples

In some example embodiments, quick-access sub-regions 208 or 308 are assigned to a play/pause command and to a volume control, while regular sub-regions 206 or 306 are assigned to menu selections for movement to other interfaces. For example, one sub-region 206 may be assigned to entrance into a sub-interface for controlling display speed (e.g., fast-forward and rewind) and another may be assigned to entrance into a movie selection interface. In other embodiments, quick access regions are assigned to a command for opening a frequently used menu and/or to a command for returning to a parent or main menu.

In another example, quick-access sub-regions 208 are assigned to rewind and fast-forward controls and regular sub-regions 206 are assigned to play, volume control and program selection commands.

In other example embodiments, most or all of the regular sub-regions 206 or 306 are assigned to menu choices, with each sub-region assigned to an item (e.g., a movie in a movie selection menu). Quick-access sub-regions 208 or 308 are optionally assigned to scrolling commands which present additional sub-regions corresponding to items, particularly when the number of selectable items is larger than the number of sub-regions presented concurrently on the interface. It is noted that in a simple embodiment, a single-dimension menu interface includes three sub-regions: a middle sub-region 206 corresponding to a selection command of a current item in the menu and side sub-regions 208 for left and right scrolling in the menu. If desired, more selection sub-regions 206 may be included, to allow faster scrolling through the items of the menu.

In some embodiments, in order to provide for more commands, one or more of the sub-regions 206, 306 is associated with different commands depending on attributes of the user movement. For example, a first action may be performed if the user raises a single finger, while a different command is performed if the user raises two fingers.

Figure 5:
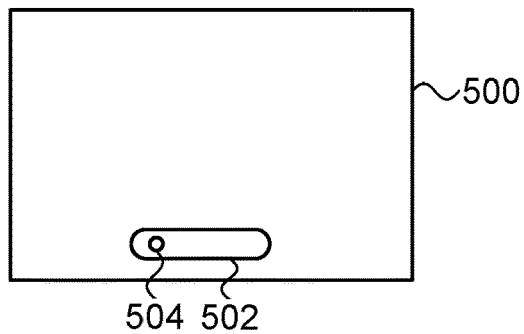
FIG. 5 is a schematic illustration of a display with a horizontal bar user interface 502, in accordance with an embodiment of the invention.

FIG. 5 is a schematic illustration of a display 500 with a horizontal bar user interface 502, in accordance with an embodiment of the invention. The movements of a cursor 504 are confined for one or more interface states to user interface 502, making it simple for the user to identify where the cursor is located.

Optionally, user interface 502 covers less than 20%, less than 10%, less than 5% or even less than 2% of the area of display 500. User interface 502 may be a horizontal bar as shown in FIG. 2, a two dimensional array as shown in FIG. 3 or may have any other suitable shape. It is noted that the system may include one or more other states in which cursor 504 is allowed to move over larger parts of display 500, possibly even over all of the area of display 500.

Display 500 may be used for example to show a movie, with interface 502 used to control fast-forward/rewind, volume, play/pause and/or other relevant commands of viewing a movie. In one or more other states, part or all of display 500 is used for presenting options for selection, e.g., movies.

Interface 502 may be located at the bottom of display 500, as shown, or in other locations, such as the top, right, left or in the middle.

Figure 6:
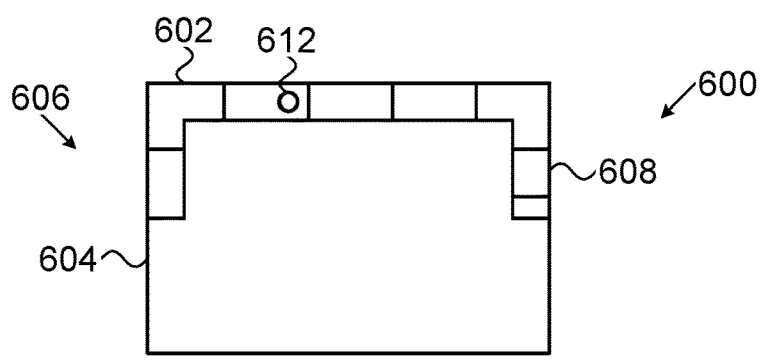
FIG. 6 is a schematic illustration of a display with a user interface, in accordance with another embodiment of the invention.

FIG. 6 is a schematic illustration of a display 600 with a user interface 602, in accordance with still another embodiment of the invention. User interface 602 is located on the upper outskirts of display 600, with the central part 604 of display 600 used for other purposes such as displaying a movie and/or selection options. Thus, central part 604 used for general display is located between a right arm 606 and a left arm 608 of interface 602.

In some embodiments of the invention, a cursor 612 of interface 602 is confined to movement within interface 602, without entering central part 604. Optionally, the movements throughout interface 602, including arms 606 and 608 are performed responsive to right-left movements of the user, and downward movements are ignored. Alternatively, movements in arms 606 and 608 are performed based on upward and downward movements of the user.

CONCLUSION

While the above description relates to hand movements, the principals of the present invention may be used with other movements, such as leg movements, body movements and/or finger movements.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computing apparatus, comprising:
a movement identifier, which is configured to detect gestures made by a hand along three axes in space; and
a processor, which is coupled to the movement identifier and is configured to specify a minimal extent of movement of the hand in a predefined direction along one of the axes, to provide commands to a controlled application responsively to the detected gestures in the predefined direction with an extent of the movement of the hand that is greater than the minimal extent, and to ignore the gestures detected in the predefined direction with an extent of the movement of the hand in the predefined direction that is less than the minimal extent, wherein the processor is configured to automatically adjust the minimal extent responsively to the gestures made by the hand by counting a number of movements of the hand in the predefined direction that were ignored by the processor followed by larger movements in response to which the processor provided the commands to the controlled application, and changing the minimal extent responsively to the number.

2. The apparatus according to claim 1, wherein the processor is configured to reduce the minimal extent when the number of movements of the hand in the predefined direction that were ignored by the processor followed by larger movements in response to which the processor provided the commands over a predetermined period was greater than a predetermined number.

3. The apparatus according to claim 1, wherein the predefined direction is an upward direction.

4. The apparatus according to claim 1, wherein one of the three axes is a depth axis, and wherein the predefined direction is along the depth axis.

5. The apparatus according to claim 1, wherein the predefined direction is a downward direction.

6. A method for computing, comprising:
    detecting, by a movement identifier, gestures made by a hand along three axes in space;
    specifying a minimal extent of movement of the hand in a predefined direction along one of the axes;
    providing commands from a processor to a controlled application responsively to the gestures detected by the movement identifier in the predefined direction with an extent of the movement of the hand that is greater than the specified minimal extent;
    automatically adjusting the minimal extent of movement of the hand in the predefined direction along the one of the axes responsively to the gestures made by the hand by counting a number of movements of the hand in the predefined direction that were ignored by the processor followed by larger movements in response to which the processor provided the commands to the controlled application, and changing the minimal extent responsively to the number; and
    ignoring the gestures detected in the predefined direction with an extent of the movement of the hand in the predefined direction that is less than the minimal extent.

7. The method according to claim 6, wherein automatically adjusting the minimal extent comprises reducing the minimal extent when the number of movements of the hand in the predefined direction that were ignored by the processor followed by larger movements in response to which the processor provided the commands over a predetermined period was greater than a predetermined number.

8. The method according to claim 6, wherein the predefined direction is an upward direction.

9. The method according to claim 6, wherein one of the three axes is a depth axis, and wherein the predefined direction is along the depth axis.

10. The method according to claim 6, wherein the predefined direction is downward direction.

11. A computer software product, comprising a tangible, non-transitory computer-readable medium in which program instructions are stored, which instructions, when executed by a computer, cause the computer to detect gestures made by a hand along three axes in space, to specify a minimal extent of movement of the hand in a predefined direction along one of the axes, to provide commands to a controlled application responsively to the detected gestures in the predefined direction with an extent of the movement of the hand that is greater than the minimal extent, and to ignore the gestures detected in the predefined direction with an extent of the movement of the hand in the predefined direction that is less than the minimal extent, wherein the instructions cause the computer to automatically adjust the minimal extent responsively to the gestures made by the hand by counting a number of movements of the hand in the predefined direction that were ignored by the computer followed by larger movements in response to which the computer provided the commands to the controlled application, and changing the minimal extent responsively to the number.

12. The product according to claim 11, wherein the instructions cause the computer to reduce the minimal extent when the number of movements of the hand in the predefined direction that were ignored by the computer followed by larger movements in response to which the computer provided the commands over a predetermined period was greater than a predetermined number.

13. The product according to claim 11, wherein the predefined direction is an upward direction.

14. The product according to claim 11, wherein one of the three axes is a depth axis, and wherein the predefined direction is along the depth axis.

15. The product according to claim 11, wherein the predefined direction is a downward direction.

* * * * *